United States Patent
Zimmerman et al.

(10) Patent No.: US 12,032,630 B2
(45) Date of Patent: Jul. 9, 2024

(54) ENTITY RESOLUTION DATA STRUCTURE SYSTEM AND METHOD

(71) Applicant: LiveRamp, Inc., San Francisco, CA (US)

(72) Inventors: Adam Zimmerman, Conway, AR (US); Terry Michael Talley, Conway, AR (US); Dwayne Collins, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 6 days.

(21) Appl. No.: 17/924,396

(22) PCT Filed: Apr. 9, 2021

(86) PCT No.: PCT/US2021/026533
§ 371 (c)(1),
(2) Date: Nov. 10, 2022

(87) PCT Pub. No.: WO2021/236250
PCT Pub. Date: Nov. 25, 2021

(65) Prior Publication Data
US 2023/0185852 A1 Jun. 15, 2023

Related U.S. Application Data

(60) Provisional application No. 63/027,755, filed on May 20, 2020.

(51) Int. Cl.
*G06F 16/00* (2019.01)
*G06F 16/901* (2019.01)

(52) U.S. Cl.
CPC .................. *G06F 16/901* (2019.01)

(58) Field of Classification Search
None
See application file for complete search history.

(56) References Cited

U.S. PATENT DOCUMENTS 8,495,212 B2  7/2013  Czyzewicz et al.
8,677,376 B2  3/2014  Kwan et al.
(Continued)

FOREIGN PATENT DOCUMENTS

CN  113139102 A  * 7/2021
CN  113849702 A  * 12/2021

OTHER PUBLICATIONS

Datanamic, "Reliable Database Data Comparison and Synchronization Tool," retrieved from https://www.datanamic.com/datadiff/ (Mar. 25, 2020).

(Continued)

*Primary Examiner* — Jean M Corrielus

(57) ABSTRACT

An entity resolution data structure system compares two data graphs by creating a confusion matrix in a distributed processing environment. A benchmark file is created from one data graph for comparison to a reference data graph. Identifiers and metadata are appended to the benchmark file to allow the comparison to take place and the construction of a confusion matrix. The confusion matrix provides a high-level indication of the results of the comparison. When the data graphs contain personally identifiable information (PII), the process does not require any PII to be transmitted in either direction between the parties who maintain the data graphs to be compared.

17 Claims, 4 Drawing Sheets

(56) References Cited

U.S. PATENT DOCUMENTS

| | | | |
|---|---|---|---|
| 9,760,654 B2* | 9/2017 | Ray | G06F 16/9024 |
| 9,785,696 B1* | 10/2017 | Yakhnenko | G06F 16/30 |
| 9,798,829 B1* | 10/2017 | Baisley | G06F 16/9024 |
| 10,516,784 B2 | 12/2019 | Hermanek et al. | |
| 10,554,665 B1 | 2/2020 | Badawy et al. | |
| 11,928,232 B1* | 3/2024 | Shen | G06N 3/045 |
| 11,941,065 B1* | 3/2024 | Li | G06F 16/9024 |
| 2010/0281022 A1* | 11/2010 | Gollapudi | G06F 16/9024 707/723 |
| 2010/0293203 A1* | 11/2010 | Williams | G06F 16/9024 715/769 |
| 2013/0297631 A1* | 11/2013 | Castonguay | G06F 16/9024 707/758 |
| 2014/0180811 A1* | 6/2014 | Boal | G06Q 20/209 705/14.53 |
| 2014/0180826 A1* | 6/2014 | Boal | G06Q 30/0269 705/14.66 |
| 2015/0006587 A1* | 1/2015 | Segaran | G06F 16/215 707/798 |
| 2015/0178645 A1* | 6/2015 | Yuan | G06Q 10/0635 705/7.28 |
| 2016/0253363 A1* | 9/2016 | Segaran | G06F 16/9024 707/692 |
| 2017/0300593 A1* | 10/2017 | Inoue | G06F 16/9024 |
| 2018/0018579 A1 | 1/2018 | Xu et al. | |
| 2018/0165294 A1 | 6/2018 | Jagota et al. | |
| 2018/0268014 A1* | 9/2018 | Holley | H04L 12/00 |
| 2018/0268079 A1* | 9/2018 | Das | G06F 16/90335 |
| 2019/0065977 A1 | 2/2019 | Xu et al. | |
| 2021/0090182 A1* | 3/2021 | Horesh | G06N 3/04 |
| 2021/0142242 A1* | 5/2021 | Bulusu | G06F 40/18 |

OTHER PUBLICATIONS

Nikolentzos, Giannis et al., "Matching Node Embeddings for Graph Similarity," Proc. 31st AAAI Conf. on AI (AAAI-17), 2429-2435, retrieved from https://www.semanticscholar.org/paper/Matching-Node-Embeddings-for-Graph-Similarity-Nikolentzos-Meladianos/0f3d2a17809f999cd4ab9d97fd5eb71086580685 (2017).

Extended European Search Report for Application No. 21809729.3 (issued Apr. 30, 2024).

* cited by examiner

| | | Gold IDs | | | | | Total Predicted IDs |
|---|---|---|---|---|---|---|---|
| | | 1 | 2 | ... | m | | |
| Predicted IDs | 1 | $C_{11}$ | $C_{12}$ | ... | $C_{1m}$ | | $TPID_1$ |
| | 2 | $C_{21}$ | $C_{22}$ | ... | $C_{2m}$ | | $TPID_2$ |
| | ... | ... | ... | ... | ... | | ... |
| | m | $C_{m1}$ | $C_{m2}$ | ... | $C_{mm}$ | | $TPID_m$ |
| | Total Additional Population | $C_{x1}$ | $C_{x2}$ | ... | $C_{xm}$ | | $TPID_x$ |
| | Total Unknown Population | $C_{y1}$ | $C_{y2}$ | ... | $C_{ym}$ | | $TPID_y$ |
| | Gold Key Population Total | $TGK_1$ | $TGK_2$ | ... | $TGK_m$ | | Total Population (TPOP) |
| Equivalence Class Metrics | Exact (Complete Unambiguous) Equivalence Class | $(C_{11} = TGID_1)$ & $(C_{x1} = 0)$ | $(C_{22} = TGID_2)$ & $(C_{x2} = 0)$ | ... | $(C_{mm} = TGID_m)$ & $(C_{xm} = 0)$ | | Total Exact Eq. Classes (TEEC) |
| | Complete (Complete Ambiguous) Equivalence Class | $(C_{11} < TGID_1)$ & $(C_{x1} = 0)$ | $(C_{22} < TGID_2)$ & $(C_{x2} = 0)$ | ... | $(C_{mm} < TGID_m)$ & $(C_{xm} = 0)$ | | Total Complete Eq. Classes (TCEC) |
| | Partial Equivalence Class | $(C_{11} + C_{x1} = TGID_1)$ & $(C_{x1} > 0)$ | $(C_{22} + C_{x2} = TGID_2)$ & $(C_{x2} > 0)$ | ... | $(C_{mm} + C_{xm} = TGID_m)$ & $(C_{xm} > 0)$ | | Total Partial Eq. Classes (TPEC) |
| | Partial Unambiguous Equivalence Class | $(C_{11} + C_{x1} = TGID_1)$ & $(C_{x1} > 0)$ | $(C_{22} + C_{x2} = TGID_2)$ & $(C_{x2} > 0)$ | ... | $(C_{mm} + C_{xm} = TGID_m)$ & $(C_{xm} > 0)$ | | Total Partial Unambiguous Eq. Classes (TPUEC) |
| | Partial Ambiguous Equivalence Class | $(C_{11} + C_{x1} < TGID_1)$ & $(C_{x1} > 0)$ | $(C_{22} + C_{x2} < TGID_2)$ & $(C_{x2} > 0)$ | ... | $(C_{mm} + C_{xm} < TGID_m)$ & $(C_{xm} > 0)$ | | Total Partial Ambiguous Eq. Classes (TPAEC) |
| | Missing Equivalence Class | $(C_{y1} = TGID_1)$ | $(C_{y2} = TGID_2)$ | ... | $(C_{ym} = TGID_m)$ | | Total Missing Eq. Classes (TMEC) |

Fig. 3

ENTITY RESOLUTION DATA STRUCTURE SYSTEM AND METHOD

CROSS-REFERENCE TO RELATED APPLICATIONS

This application claims the benefit of U.S. provisional patent application No. 63/027,755, entitled "Data Graph Comparison Using Distributed Processing Construction of Confusion Matrices," filed on May 20, 2020. Such application is incorporated herein by reference in its entirety.

BACKGROUND OF THE INVENTION

An entity resolution system is a computerized system that operates to process data concerning an entity and attempts to positively identify that entity from among a population of entities. An entity resolution data graph or just "data graph" may be used for this purpose. A data graph consists of a large set of assertions describing entities or objects. These entities may be, for example, persons, households (i.e., sets of persons), or businesses in the case of an identity data graph. In an identity data graph, the assertions may include personally identifiable information (PII) as well as non-PII attributes. Identity graphs in commercial settings may be very large, including billions of records with hundreds or thousands of attributes (fields) in each record. Data graphs used in other fields, such as medicine, may similarly include an enormous number of nodes for objects and the corresponding connecting edges.

Currently, there is no effective means of comparing two very large data graphs to each other in order to determine the level of agreement between the data graphs, or the accuracy of either data graph if one graph is considered the reference. A method of performing a comparison and providing meaningful output would therefore be desirable in order to determine the accuracy or at least the degree of agreement between the data graphs in question. Because of the various restrictions on the use of personally identifiable information (PII), particularly the restrictions placed on transmission of PII outside of a particular organization located in a particular geographic region, it would further be desirable to develop a method of comparing data graphs (such as identity graphs) that contain this information in a way that does not require the use of PII in either direction of communication between the data graphs.

Confusion matrices are well known in the field of machine learning. A confusion matrix is a table layout that allows visualization of the performance of a machine learning algorithm, typically in the context of supervised machine learning. Usually, each row of the matrix represents instances in a predicted class while each column represents the instances in an actual class. The confusion matrix provides the researcher with an easily read indication of how accurately the machine learning algorithm performed the classification task to which it was assigned by indicating how often a predicted classification matched an actual classification. The inventors hereof have recognized that confusion matrices could be used to visualize other types of comparisons, in particular comparisons between data graphs, but that construction of confusion matrices according to prior art methods when comparing data graphs with billions of records would be computationally infeasible. Therefore, a method of performing such a comparison to generate confusion matrices in a manner that produces a result in a feasible time frame on extant computing equipment would also be desirable.

References mentioned in this background section are not admitted to be prior art with respect to the present invention.

BRIEF SUMMARY OF THE INVENTION

The present invention is directed to a system and method for comparing two data graphs that creates confusion matrices. The confusion matrices may be read to provide a high-level indication of the results of the comparison. When the data graphs contain PII, the process does not require any PII to be transmitted in either direction between the parties who maintain the data graphs to be compared. Furthermore, the process does not depend upon the quality of the data graph being compared to a reference data graph. In certain implementations of the present invention, a benchmark file is created from one data graph for comparison to a reference data graph. Identifiers and metadata are appended to the benchmark file. The application of the identifiers allows the comparison to take place and the construction of the confusion matrices. A distributed processing method is used in order to make the process computationally feasible.

These and other features, objects and advantages of the present invention will become better understood from a consideration of the following detailed description of certain embodiments in conjunction with the drawings and appended claims.

BRIEF DESCRIPTION OF THE DRAWINGS

FIG. 3 is an example confusion matrix according to an implementation of the present invention.

DETAILED DESCRIPTION

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims in a subsequent nonprovisional application.

Figure 1:
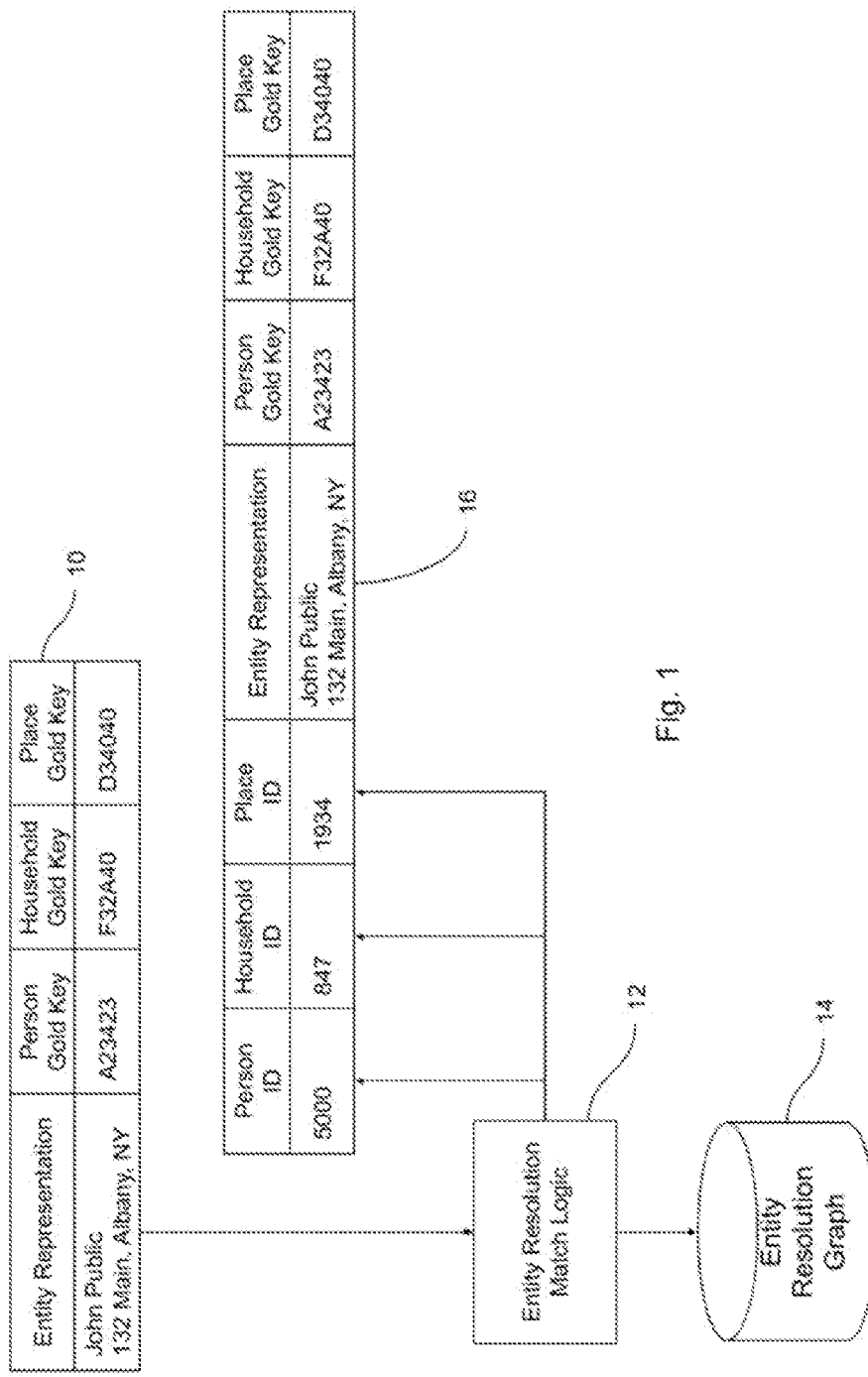
FIG. 1 is a logical diagram of certain data structures according to an implementation of the present invention.

Referring now to FIG. 1, the process for performing a method according to an embodiment of the invention may now be described. The data graph to be compared is first reduced to a benchmark file. The benchmark file consists of a set of records, perhaps billions of such records, with one record for each entity. FIG. 1 shows one example data graph record 10, but it will be understood that this is simply an example and the actual system would include a great many such records. Each record comprises an entity representation, which in the case of an identity graph comprising data about persons and households (i.e., groupings of persons) may include a name, postal address, telephone number, email address, and the like. In the example of data graph record 10, only the name and address are shown for sake of simplicity. Each entity representation is assigned one or more "gold" keys, which are identifiers for each entity representation that are unique across the universe of all entity representations within the identity graph. The term "gold" key is used herein to denote any identifiers used within the data graph that is to be compared to a reference data graph. The identifiers may take any form so long as they are unique with respect to each entity representation within the data graph to be compared.

There may be multiple gold keys assigned to each entity representation; for example, a single entity representation for a person may be assigned a gold key for the person, a gold key for the household to which that person belongs, and a gold key for the place that the person resides. Each type of gold key is unique within its space; thus, each person gold key is unique among all person gold keys; each household gold key is unique among all household gold keys; and each place or location gold key is unique among all place or location gold keys. In this way, each gold key can represent a particular, unique person; a particular, unique household; or a particular, unique place. Multiple persons sharing a household will have the same household gold key assigned to them. Likewise, persons and/or households sharing the same location may have the same place gold keys assigned them. In the example of data graph record 10, a six-digit alphanumeric is used for each of the person gold key, household gold key, and place gold key, although these gold keys could be represented in any other form within the computing environment. It will be readily understood that the invention in alternative implementations may be extended to any other type or types of data objects, and may employ one or any greater number of gold keys.

After assigning the gold keys to each entity representation as in data graph record 10, the modified benchmark file is introduced to the entity resolution system match logic process 12. The entity resolution match logic 12 process utilizes the reference data graph (i.e., the entity resolution graph 14) to assign the reference data graph's own identifiers to each entity resolution of the benchmark file. Like the gold keys, the reference data graph's identifiers are unique for each person, household, or place that is known to that data graph. The result of this process, as shown in FIG. 1, is that each entity representation will have assigned to it both one or more gold keys and one or more identifiers from the entity resolution graph (i.e., the reference data graph) as represented by the sample entity resolution graph record 16. Again, it should be understood that entity resolution graph record 16 is only one example, with it being understood that the output of this process would typically include a great many such records.

Figure 2:
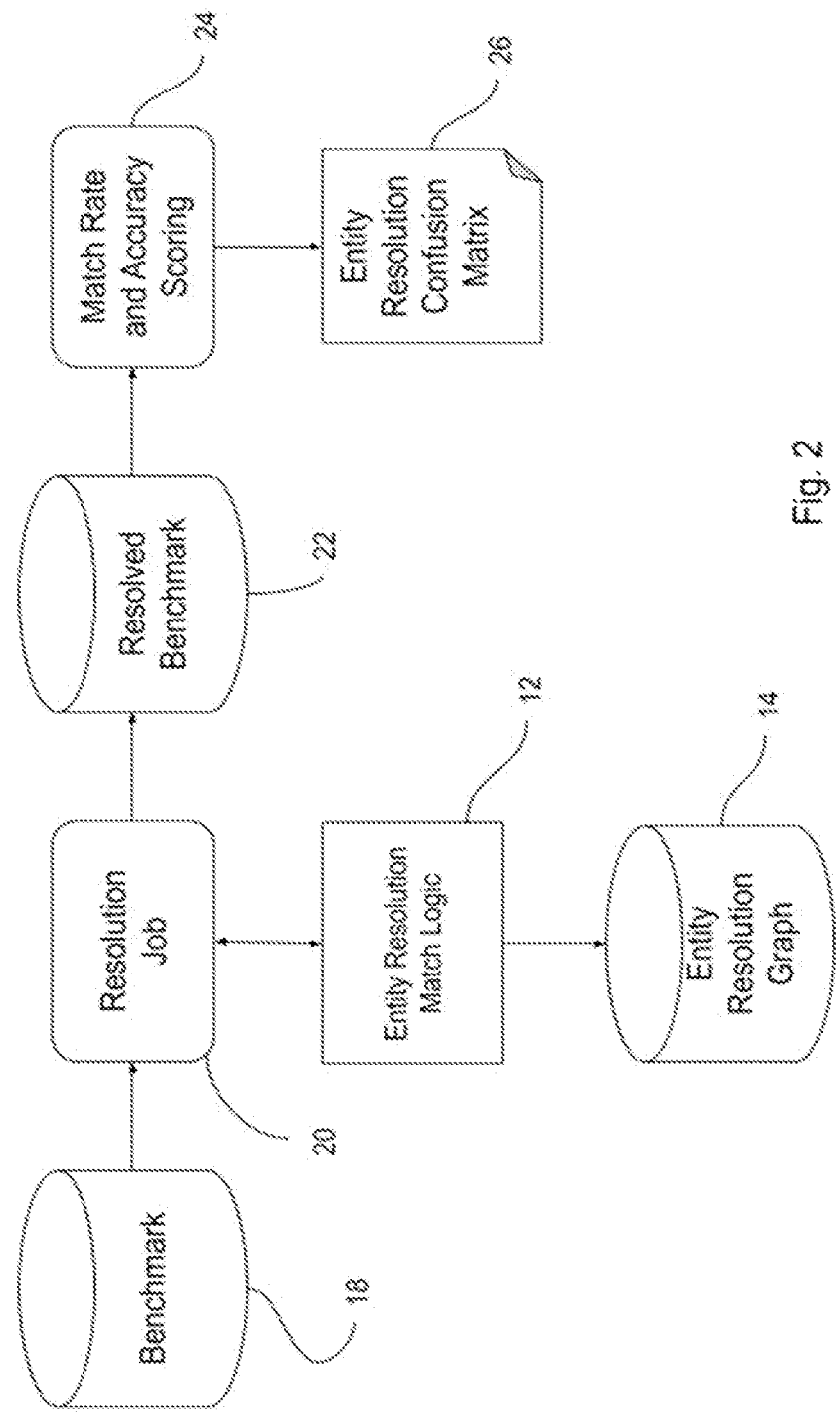
FIG. 2 is a logical structure for a system according to an implementation of the present invention.

This process may also be visualized as shown by the data flow diagram of FIG. 2. The benchmark input file 18, after the assignment of gold keys, is fed to the resolution job 20, which is powered by the entity resolution match logic 12 process using the entity resolution graph 14. The "resolved" benchmark (i.e., the benchmark file with both gold keys and identifiers from the entity resolution graph) 22 is then sent for match rate and scoring 24, which produces the entity resolution confusion matrix 26 as hereinafter described.

Figure 4:
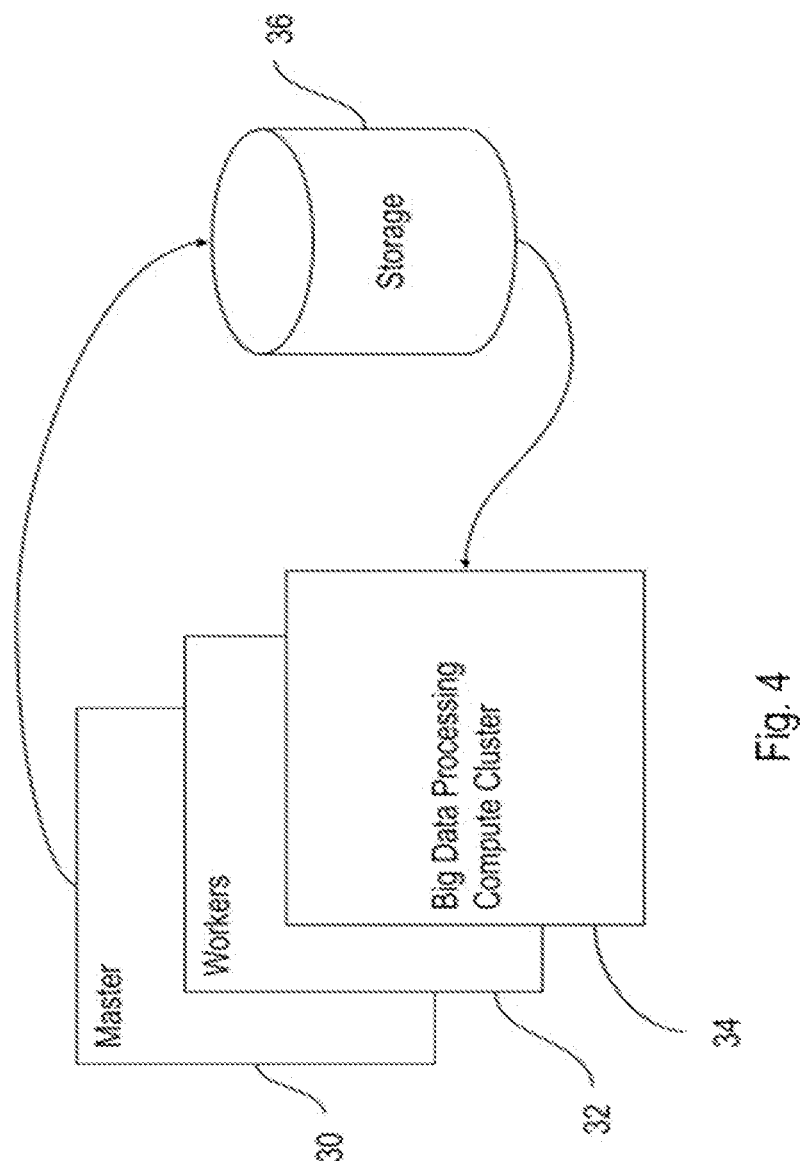
FIG. 4 is a logical diagram of a cloud computing system for an implementation of the present invention.

Construction of the entity resolution confusion matrix 26 at the scale of billions of records cannot feasibly be performed with available computation resources in a sequential fashion. Rather, it is performed through distributed processing. In one implementation a framework such as MapReduce is employed, which is a programming model used for very large data sets using a parallel, distributed algorithm on a computing cluster to support large data joins. FIG. 4 provides a general architectural view of a MapReduce system in which the invention may be implemented using the Hadoop framework. The system outputs reside within the context of distributed storage 36. Generally speaking, a Hadoop cluster minimally requires a master server and a worker server. In this case, the cluster includes master 30, a plurality of workers 32, all within the framework of the Big Data processing compute cluster 34. The invention is not limited to implementation in a Hadoop framework, however, and other software packages may be used in alternative implementations of the invention.

Applying the MapReduce framework, filtering and sorting is first performed, and then a reduce method is applied which performs a summary operation. Specifically, the process goes through the following phases in a particular implementation of the invention:
1. group all the gold keys for each unique predicted key (a predicted key being an identifier used in the reference data graph);
2. emit a single gold key for each unique predicted key based on frequency;
3. group all predicted keys for each unique gold key;
4. pick a single predicted key for each unique gold key based on frequency;
5. at this point the confusion matrix has been built, now group one to one mappings on gold key;
6. sum up the following regions of the confusion matrix:
   a. total population;
   b. total gold key population, which represents the unique population of the data;
   c. total unknown population (TMEC), which represents the population in the benchmark file that was unknown in the reference data graph;
   d. total additional population, which represents the population in the reference data graph not in the benchmark file;
   e. total disagreement, which represents the overlapping population that disagreed between the benchmark file and the reference data graph (sum of yellow cells in the confusion matrix);
   f. total agreement, which represents the overlapping population where the benchmark file and the reference data graph agreed (sum of green cells in the confusion matrix);
   g. total exact (TEEC), which represents the unambiguous complete equivalence class in which there only exists agreement for the gold key in the column;
   h. total complete (TCEC), which represents the equivalence class in which there were no missing identifiers for the gold key in the column although there may be some disagreement between the gold key and predicted key;
   i. total partial (TPEC), which represents the equivalence class in which there were some missing predicted keys for the gold key in the column but there was at least one predicted key that was either correct or incorrect when compared to the gold key;
   j. unambiguous partial (TPUEC), which represents the population of the benchmark file where all predicted identifiers in the reference data graph agree, but not all of the population was present in the reference data graph;
   k. ambiguous complete (TCEC), which represents the population of the benchmark file where all of the population overlapped with the reference data graph but not all predicted identifiers agreed; and
   l. ambiguous partial (TPAEC), which represents the population of the benchmark file where not all of the population was present in the reference data graph and not all of the predicted identifiers agreed with the benchmark file.

An example confusion matrix constructed according to this method according to an implementation of the invention is shown in FIG. 3. TPID in FIG. 3 refers to a "total predicted ID," with other abbreviations and terms being as defined above or within FIG. 3 itself. It may be seen from FIG. 3 that the resulting confusion matrix contains no personally identifiable information (PII). Thus the system allows for the comparison of data graphs without requiring the use or transmission of any PII in the data graphs, thus greatly decreasing the risk that any personal data for any persons who data is collected in either graph may be lost or intercepted.

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included in the disclosure. All references cited herein are hereby incorporated by reference to the extent that there is no inconsistency with the disclosure of this specification. When a range is used herein, all points within the range and all subranges within the range are intended to be included in the disclosure.

The present invention has been described with reference to certain preferred and alternative implementations that are intended to be exemplary only and not limiting to the full scope of the present invention.

The invention claimed is:

1. A method for comparing data graphs, the method comprising the steps of:
constructing a benchmark file from a source data graph, wherein the benchmark file comprises a plurality of records each comprising an entity representation;
assigning a gold key to each entity representation of the benchmark file, wherein each gold key is an identifier that is uniquely associated with an entity in the source data graph;
running a match process between the benchmark file and an entity resolution system, wherein the entity resolution system utilizes a reference data graph for matching, wherein the reference data graph comprises a plurality of entity representations, and wherein each entity representation in the reference data graph comprises at least one identifier;
for each matched entity representation between the benchmark file and the reference data graph, copying each identifier in the matched entity representation in the reference data graph to the matched entity representation in the benchmark file; and
scoring the benchmark file to produce an entity resolution confusion matrix by
grouping all gold keys for each unique predicted key;
emitting a single gold key for each unique predicted key based on frequency;
grouping all predicted keys for each unique gold key;
picking a single predicted key for each unique gold key based on frequency;
summing up a total population of the benchmark file;
summing up a total gold key population, wherein the total gold key population comprises the unique population of the benchmark file;
summing up total unknown population, wherein the total unknown population comprises the population in the benchmark file that was unknown in the reference identity graph;
summing up total additional population, wherein the total additional population comprises the population in the reference identity graph but not in the benchmark file; and
inserting the total population, total gold key population, total unknown population, and total additional population into the confusion matrix to provide an ability to readily compare the source data graph and entity resolution system without revealing personally identifiable information (PII).

2. The method of claim 1, wherein the gold key assigned to each entity representation is a person gold key, wherein each person gold key is unique with respect to all person entities in the benchmark file.

3. The method of claim 2, further comprising the step of assigning to at least one entity representation a household gold key, wherein each household gold key is unique with respect to all household entities in the benchmark file.

4. The method of claim 3, further comprising the step of assigning to at least one entity representation a location gold key, wherein each location gold key is unique with respect to all locations of entities in the benchmark file.

5. The method of claim 1, wherein each entity representation comprises at least one of a name or a postal address or a telephone number or an email address.

6. The method of claim 1, wherein the identifier assigned to each entity representation in the reference identity graph is a person identifier, wherein each person identifier is unique with respect to all person identifiers in the reference identity graph.

7. The method of claim 6, wherein the identifier assigned to each representation in the reference identity graph further comprises a household identifier, wherein each household identifier is unique with respect to all household identifiers in the reference identity graph.

8. The method of claim 7, wherein the identifier assigned to each representation in the reference identity graph further comprises a location identifier, wherein each location identifier is unique with respect to all location identifiers in the reference identity graph.

9. The method of claim 1, wherein the step of producing an entity representation confusion matrix is performed in a distributed computing system on a computing cluster through parallel processing.

10. The method of claim 9, wherein the step of producing an entity representation confusion matrix is performed in a batch parallel framework supporting large data joins.

11. The method of claim 1, wherein the step of producing an entity representation confusion matrix comprises the steps of filtering, sorting, and reduction.

12. The method of claim 1, further comprising the step of grouping one-to-one mapping based on a corresponding gold key.

13. The method of claim 1, further comprising the step of calculating total disagreement, wherein the total disagreement comprises the overlapping population that disagreed between the benchmark file and the reference identity graph, and inserting the total disagreement into the confusion matrix.

14. The method of claim 13, further comprising the step of calculating total agreement, wherein the total agreement comprises the overlapping population that agreed between the benchmark file and the reference identity graph, and inserting the total agreement into the confusion matrix.

15. The method of claim 14, further comprising the step of calculating unambiguous partial, wherein the unambiguous partial comprises the population where all predicted identifiers in the reference identity graph agree, but not all of the population was present in the reference identity graph, and inserting the unambiguous partial into the confusion matrix.

16. The method of claim 15, further comprising the step of calculating ambiguous complete, wherein the ambiguous complete comprises the population of the benchmark file where all of the population overlapped with the reference identity graph but not all predicted identifiers agreed, and inserting the ambiguous complete into the confusion matrix.

17. The method of claim 16, further comprising the step of calculating ambiguous partial, wherein the ambiguous partial comprises the population of the benchmark file where not all of the population was present in the reference identity graph and not all of the predicted identifiers agreed with the benchmark file, and inserting the ambiguous partial into the confusion matrix.

* * * * *